United States Patent [19]

Higbee et al.

[11] 4,044,799
[45] Aug. 30, 1977

[54] CELLULAR WALL HOSE AND METHOD FOR MAKING SAME

[75] Inventors: Charles D. Higbee, Arvada; Bennie A. Stevens, Denver, both of Colo.

[73] Assignee: The Gates Rubber Company, Denver, Colo.

[21] Appl. No.: 226,675

[22] Filed: Feb. 16, 1972

Related U.S. Application Data

[62] Division of Ser. No. 724,928, April 29, 1968.

[51] Int. Cl.² .................................................. F16L 11/00
[52] U.S. Cl. ..................................... 138/125; 138/137; 138/177
[58] Field of Search ................. 138/DIG. 9, 125, 130, 138/137, 138, 177

[56] References Cited

U.S. PATENT DOCUMENTS

| | | | |
|---|---|---|---|
| 2,788,804 | 4/1957 | Larkin | 138/125 |
| 3,289,703 | 12/1966 | Brown | 138/125 |
| 3,547,162 | 12/1970 | Shaerer | 138/124 X |

FOREIGN PATENT DOCUMENTS

922,116  3/1963  United Kingdom ................. 138/138

OTHER PUBLICATIONS

B.F. Goodrich Publication on "Spongex", received in Patent Office, Jan. 13, 1958.

*Primary Examiner*—William Price
*Assistant Examiner*—Ro E. Hart
*Attorney, Agent, or Firm*—Raymond Fink; H. W. Oberg, Jr.; Curtis H. Castleman, Jr.

[57] ABSTRACT

A method for simultaneously extruding and foaming a seamless, closed cell, cellular, tubular conduit by extruding through no-land die and restricting foaming action until the conduit has been extruded. The resultant conduit can be made either uni-layer or multiple layer, with or without reinforcing with any of the layers foamed to produce an extremely flexible hose at a wide temperature range and having great resistance to kinking.

2 Claims, 7 Drawing Figures

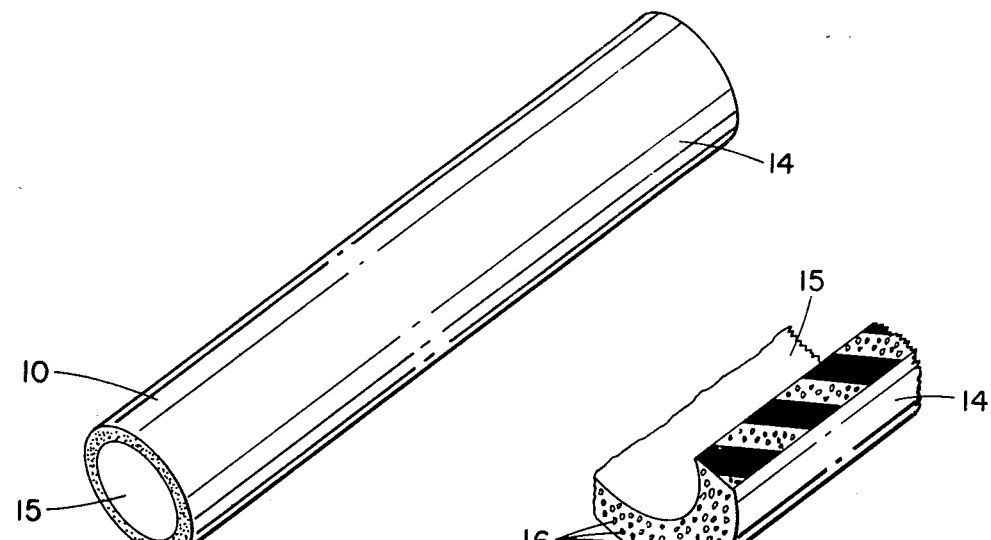
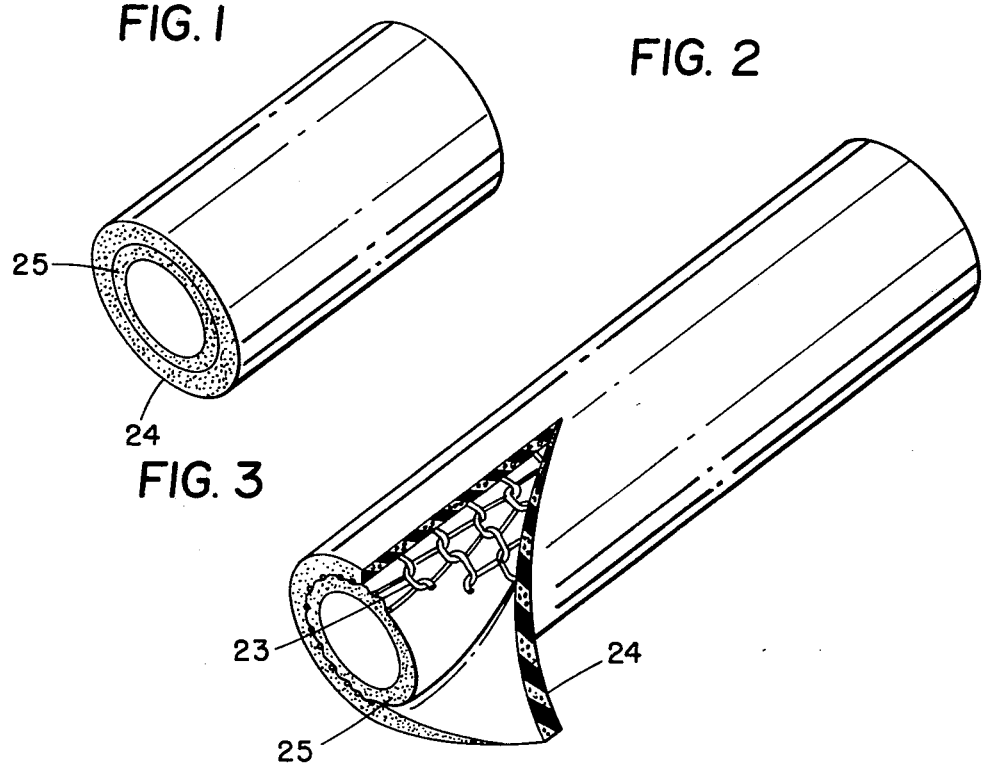

CELLULAR WALL HOSE AND METHOD FOR MAKING SAME

This is a division of application Ser. No. 724,928, filed Apr. 29, 1968.

Prior art shows conduit structures having foamed laminate which generally is formed as a separate foaming operation after the conduit structure has been poured in place. None of the prior art indicates a method for simultaneously extruding and foaming the material into a tubular conduit structure. The present invention encompasses a method for simultaneously extruding any number of layers and foaming those layers to form a seamless, fluid-tight hose structure having closed cells. The resultant structure is extremely flexible at a wide temperature range and has a tendency to resist kinking. The method encompasses extruding polymer compositions containing a blowing agent through a single or plurality of no-land dies with very close temperature and pressure control in order to preclude foaming of the material within the barrel of the tuber and have the cell structures formed immediately as it emerges from the die. Previously, similar foamed structures were formed by casting over preformed surfaces or by casting between preformed surfaces or shapes which served as a mold cavity.

It has been found that hose having either a single or plurality of such foamed layers which may either be reinforced or not according to the use for which it is designed has an unexpected wide flexibility range regardless of the temperature. It is assumed that the formation within the body of the hose of a myriad of closed cells allows for this flexibility since conduit formed from solid material which has no foam or cellular structure will experience severe flex restrictions generally at lower temperatures. The method is additionally such that even though the surface may have a slight ripple or "orange peel" effect, the interior and exterior surfaces are continuous and are of a closed cell nature and the tube is, therefore, impervious to fluid. The total overall strength of the fabricated conduit tests out to have a significant burst strength which is not reduced by the cellular structure, but rather may be enhanced.

It is, therefore, an object of this invention to provide a method for simultaneously extruding and foaming a seamless, conduit structure having closed cell structures.

It is another object of this invention to provide an extremely flexible extruded conduit that maintains a large degree of flexibility over a wide temperature range generally between $-40°$ to $+190°$ F.

It is still another object of this invention to provide a polymer based extruded conduit having internal closed cellular structure that is fluid-tight.

It is still another object of this invention to provide an extruded foamed conduit having closed cells with both the internal and external surfaces being smooth, continuous and closed cell.

Still another object of this invention is to provide a method for forming closed cell, fluid-tight structure composed of a plurality of laminates for internal fabricating reinforcement.

Another object of this invention is to provide a conduit, the layers of which are comprised of closed cell, polymeric material and having relative high burst strength.

These and other objectives of this invention will become apparent to those skilled in the art in view of the appended drawings and the explanatory specifications and claims which follow.

FIG. 1 is a section of an extruded, blown, cellular, foam conduit.

FIG. 2 is a blown-up view of the section of the wall indicated by the view AA of FIG. 1.

FIG. 3 is a section of non-reinforced multiple layer hose according to this invention.

FIG. 4 shows a profile embodiment of the invention as a cut-away section of a multiple layer hose having internal fabric reinforcement.

Figure 5:
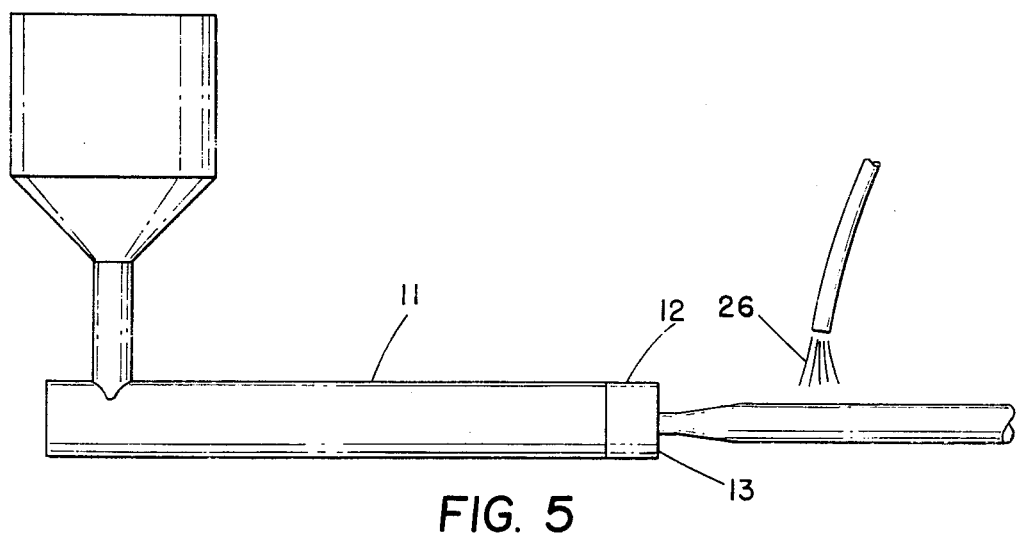
FIG. 5 is a schematic of the method for producing the conduit as embodied by this invention.
Figure 6:
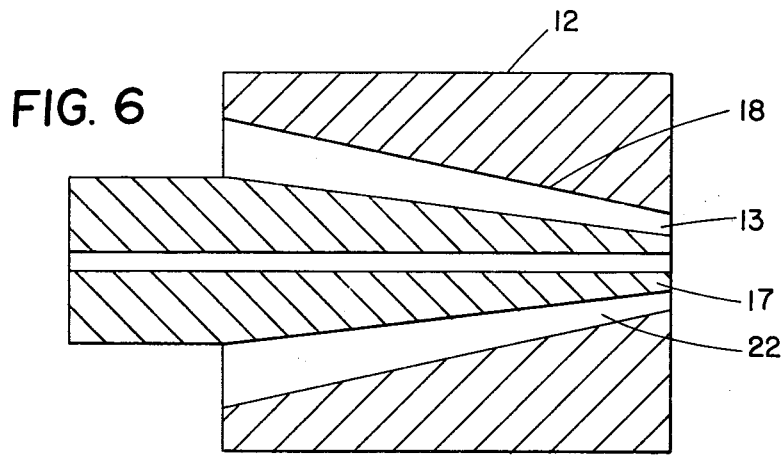
FIG. 6 shows a cross-section of one of the die structures having no-land area used to simultaneously extrude and foam hose according to this invention.
Figure 7:
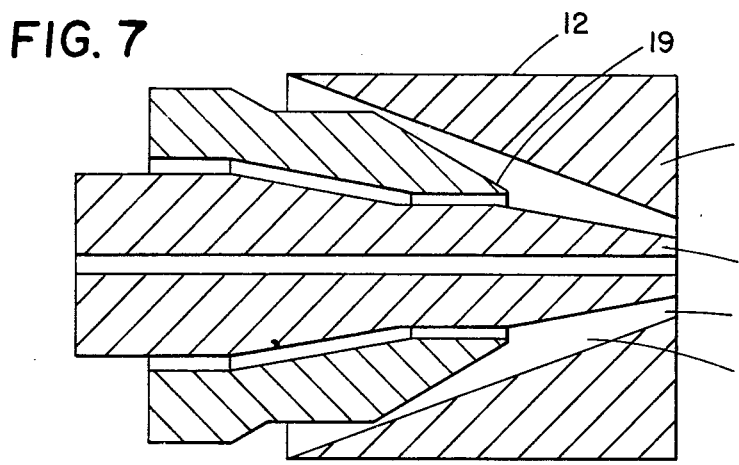
FIG. 7 shows a die structure having two-stage, no-land, paper die or configuration to allow for simultaneously extruding multiple layer laminated conduit.

One of the difficulties with attempting to simultaneously foam and extrude a composition containing a blowing agent to a tubular structure 10 is premature blowing in the barrel of the tuber 11 such that the blown material will be remixed and subsequently extruded to form a non-cellular structure. On the other hand, the opposite result is possible if the blowing takes place subsequent to the time of leaving the die 12 such that blowing takes place in an unconfined manner resulting in a blown, distorted structure. It is obvious, therefore, that the blowing must take place in a period of the time sequence of the extrusion subsequently just as the tuber structure leaves the end 13 of the extrusion die 12. In addition to temperature control allowing for activation of the blowing material and the subsequent formation of gas, the material must be correlated with pressure control. Thus, the material undergoes a continuous increased pressure exposure until the very end 13 of the die 12 is reached where there is a sudden decrease in pressure allowing for blowing right at the end of the extrusion die, filling the internal matrix with myriad minute cells 16. The tube at this point is no longer confined and the internal blowing is allowed, thereby forming the cells 16. On the other hand, the external 14 and internal 15 surface of the tube is at a low enough temperature that a flowing or closing of the cell structure occurs resulting only in a slightly rippled effect. The surface, however, is continuous, seamless and relatively smooth.

In order to induce the continuously increasing pressure exposure on the material as it is worked from the barrel of the tuber 11 to the extrusion portion of the die 12 of the die pin 17 has a configuration of the hollow truncated cone having effective angle of approximately one-half of the hollow truncated cone of the concentrically over-laying die 18. Thus, as the material is worked forward, it is compressed into a volume of decreasing size as determined by the confinement within the angle differentials formed by the pin 17 and the die 18.

The material is to be subjected to a progressively greater pressure as it moves over the pin 17 and through the die 18. The die 18 is spaced similar to a truncated cone and the pin 17 has a uniform taper. The interaction of the two is such that the die 18 constricts faster than the taper of the pin 17 so that the stock is formed into an increasingly smaller volume thereby progressively increasing the pressure. At the end 13 of the tapered die 18 and pin 17, the stock is released abruptly from the pressure and the expansion is allowed to occur. The very end portion of the die 18 has a no-land configuration which forms the extruded material into the final product. In other words, there is no straight concentric annulus present as in other normal extrusion pin and die combinations.

Amplification should be made of the importance of the no-land die feature of this invention which when combined with the two-stage uniform taper fore-pin 19, after-pin 20 and two-stage die 21 are felt to be of prime importance. As previously explained, continued pressure down to the end 13 of the die at which point the gas can expand or blow is of prime importance. This is to keep the gas from expanding or blowing prematurely within the die cavity 22 rather than externally at the die end 13. Upon release of the compressive forces the gases are then allowed to expand or blow. If an ordinary die land forming an annulus at the die end is present, the gases will expand within the land portion and before the extruded tube is released. Such a configuration allows a release of the compressive pressure forces. This release of pressure coupled with maintained elevated temperature retains the plastic in a very fluid condition such that the gas is allowed to expand continuously throughout the polymeric material.

On the other hand, one of the important features of the current invention is the complete elimination of the land. The significance or importance of this elimination of the land portion is that in addition to allowing the gas to expand, this expansion is coupled with a radical reduction of the ambient temperature. This decrease in the heat is accompanied by a marked increase of the plasticity of the polymeric material so that even though the gas is expanded it is retained within the structure in the form of closed cells 16. In addition, as is customary with other extrusions of this type within a very short period of time the temperature of the polymeric material is further reduced by external aids such as a cooling bath 26.

Knit fabric 23 or other reinforcement may be separately applied between the cover 24 and tube 25 thereby increasing the strength of the conduit. This is done by first forming the seamless, closed cell, cellular tube 25, placing the knit 23 or braid thereover and subsequently then applying the second layer which may be a final cover layer 24 or an intermediate layer. This is done by passing the reinforced tube through a tapered die having decreasing volume with a correspondingly increasing pressure gradient to form the layer thereover. Once again, the final dimensions are controlled at the final exit point 13 where the material is allowed to expand and concurrently the outer surfaces are closed.

The polymeric material may be a natural rubber latex or other synthetic rubber latices. On the other hand, a very great advantage has been found by using various plastic material such as vinyl halides, urethanes, polyethylene or other materials which are capable of being formed. The advantage of using the latter plastics is that generally heat alone is needed for setting the compound; otherwise, of course, proper chemical curatives can be added for proper cure. Various blowing agents are available. The one preferred is azo dicarbonamid. This material when heat is applied will release nitrogen gas in order to foam the product. Other blowing agents are available such as dinitroso pentamethylene tetramine. Both of these blowing agents depend upon heat to activate them. The former nitrogen gas producing agent is the one preferred for this invention.

The resultant structure 10 is unique in many ways. Because of the closed cells, the tubular structure is impervious to fluid.

Even though there is normal wall gauge or even larger than normal wall gauge, the relatively low mass due to the inclusion of a large amount of air space makes the structure extremely flexible even in cold wheather. The only portion which can undergo stiffening thereby decreasing the flexibility is a very thin wall portion which is separated by a completely flexible air space 16. High structural strength results from the closed cellular structure. On the other hand, the resulting mass is extremely low. The relatively large bulky wall with the corresponding low mass allows not only a very flexible structure to result but also the structure has little likelihood to undergo a kinking or cutting off of the inner tubular space.

Since the foaming composition can be used to form a structure having high bulk with low mass, this characteristic can be used to further increase the kinking resistance of a conduit formed by this process. By applying a cover of substantially the same wall gauge as the wall gauge of the inner tube, little or no kinking of the resultant conduit will result due to the large external bulk. This 1 to 1 wall gauge ratio is not feasible with normal construction hose. With foamed tube and cover, substantially equal wall gauge is not only feasible but desirable since a substantially non-kinking hose results. This dimensional relationship of 1 to 1 wall gauge ratio imparts a wall covering which adds to the structural rigidity to the extent that kinking is extremely difficult. On the other hand, since there is very little mass, with extremely thin cellular wall thicknesses separated by relatively large air spaces 16, the rigidity is accompanied by relatively great flexibility. The resulting product, therefore, has the unique combined characteristic of being extremely flexible even in the very lowest of temperatures but yet maintains structural rigidity to the extent that there is very little likelihood of kinking. It is felt that the explanation is that the bulk of the wall is characterized by low mass.

Here again, as was previously explained, burst strength can be added with no sacrifice of either flexibility or resistance to kinking by placing therebetween either knit 23 or braid in order to specifically increase the burst strength.

Accordingly, the foregoing detailed description has been given for the purposes of illustration only and is not intended to limit the scope of the present invention, which is to be determined from the appended claims.

We claim:

1. An extruded, foamed, tubular product comprising:
    an inner seamless tube having a multitude of closed gas-filled cells interspersed throughout the walls of said tube;
    an outer cover comprising a wall structure having a multitude of gas-filled cells interspersed throughout said walls of the outer cover; and
    at least one intermediate seamless, closed cell, cellular layer contiguous to the next adjacent inner layer and the next concentric outer layer.
2. A structure according to claim 1 in which a reinforcing structure is placed between each contiguous layer.

* * * * *